Aug. 13, 1963

H. E. DRAKE ETAL 3,100,815

APPARATUS FOR PRODUCING COLOR SEPARATION
NEGATIVES AND THE LIKE

Filed April 29, 1959

INVENTORS
HERBERT E. DRAKE
LEONARD KRAL
BY
ATTORNEYS

FIG. 2

INVENTORS
HERBERT E. DRAKE
LEONARD KRAL
BY
ATTORNEYS

United States Patent Office

3,100,815
Patented Aug. 13, 1963

3,100,815
APPARATUS FOR PRODUCING COLOR SEPARATION NEGATIVES AND THE LIKE
Herbert E. Drake, Willowick, and Leonard Kral, Columbia Station, Ohio, assignors to Newspaper Enterprise Association, Inc., Cleveland, Ohio, a corporation of Delaware
Filed Apr. 29, 1959, Ser. No. 809,817
8 Claims. (Cl. 178—5.2)

This invention relates to the production of photographic reproductions of an original color photographic image and more particularly to apparatus for the production of separate photographic images corresponding to the distribution of the primary colors in an original photographic image. The separate images produced by the apparatus may be used to produce the plates to be used in color printing processes in which the plates print in colored inks, the colors of which are the complementary colors of the primary colors into which the colors of the original image are resolved by the apparatus.

It is well known to those skilled in the techniques and processes of color photography and color printing that the dyes presently available cannot accurately recreate with absolute fidelity the colors of the scene photographed. Generally, the best result which can be obtained is a compromise which results in the reasonably accurate reproduction of the colors of the subject which is the center of interest in the photographed scene through empirical control of the photographic processes.

To further complicate the entire process of reproduction in color of a photographed scene by color printing the available inks cannot accurately combine to produce all the required hues and shades of a multicolor scene. In three-color printing processes it is possible for the photoengraver to correct for color errors by so-called masking techniques. Theoretically, there must be made one printer for each of the three complementary colors. But to provide complete color correction it is also necessary to produce two other masking images to correct the intensity of the complementary color to be printed by the amount that the color is in error in the content of the other two of the three complementary colors. From a practical and economic standpoint making so many separate masking printers is an impossibility.

An additional problem is raised by the fact that colored inks used in printing magazines and other forms of mass publications are relatively expensive as compared with ordinary black inks. It has previously been proposed to supply the so-called neutral denstiy and the straight blacks and grays of a picture by the use of a fourth printing plate which prints with black ink instead of making the black and gray areas of a scene by overprinting heavy layers of three different colors of inks. To be sure, overprinting of three inks of the complementary colors will effect blacks and the varying shades of gray, but the inordinate expense involved is obvious when contrasted with the simpler technique of printing black and gray areas with relatively inexpensive black ink. This requires some means for analyzing the original image for blacks and grays and the so-called neutral density of colored areas and for making a fourth printer or photographic image from which the black printing plate may be made by conventional photoengraving processes.

We have invented novel apparatus which scans a photographic or other color image to be reproduced by color printing process and which analyzes the image in terms of the three primary colors. Photoelectrical transducers convert the intensity of each of the three primary color components of the scanned image into three electrical signals and these signals are then separately modified by novel electronic means to effect the light equivalent of color correction masking. We also provide means for analyzing the separate color signals and deriving from them a fourth signal which is the electrical equivalent of the black, gray and neutral density components of the image to be reproduced. These latter means also determine those parts of an image which will be reproduced as black or gray and hold back or prevent the production of signals which would ultimately form the corresponding image on the color printers, thereby conserving the relatively expensive colored inks.

Particular aspects of the circuitry according to our invention are also novel and have utility independently of the entire apparatus. One of these is a photoelectrical densitometer utilizing a photomultiplier tube in combination with a triode vacuum tube, the operating range of which is such that the grid of the tube draws current proportional to the current in the photomultiplier tube. Inasmuch as the light transmitted through or reflected from an image is logarithmically proportional to the optical density of the image and further that the triode is a logarithmic device under the specified operating conditions, the plate current of the triode will then be linearly proportional to the optical density of the image.

A further novel feature of our invention is a balanced cathode follower. This comprises a pair of vacuum tubes each of which is arranged as a cathode follower. Any desired input signal is impressed on the input element of one of the triodes while a constant voltage is impressed on the input element of the other tube. The output signal of this combination of tubes is the difference in potential between the cathodes of the two tubes, the cathode potential of the one tube serving as a highly stable, internally developed reference potential about which the cathode potential of the other tube varies.

An additional novel aspect of our invention is a comparator circuit for determining which of two or more voltages is the least and for passing only that one voltage.

We have also invented a novel modulator and gating circuit in which an alternating current carrier signal is amplitude modulated in accordance with the variations of an applied signal. The operating characteristic of the circuit is such that an output signal is produced only when the applied signal is present. Accordingly, the unmodulated carrier signal never appears in the output of the modulator circuit. Such a modulator circuit comprises a triode vacuum tube having an alternating current carrier signal applied to its grid. The only plate potential supplied to the tube is the applied signal according to which the carrier is to be modulated. Hence, in the absence of a signal at the plate the tube is rendered non-conductive and no signal is developed in the tube load.

We will now describe in detail a particular embodiment of our invention which incorporates all of the foregoing features as well as others which will be pointed out in the course of the description. In the description, reference is made to the accompanying drawings, in which.

Figure 1:
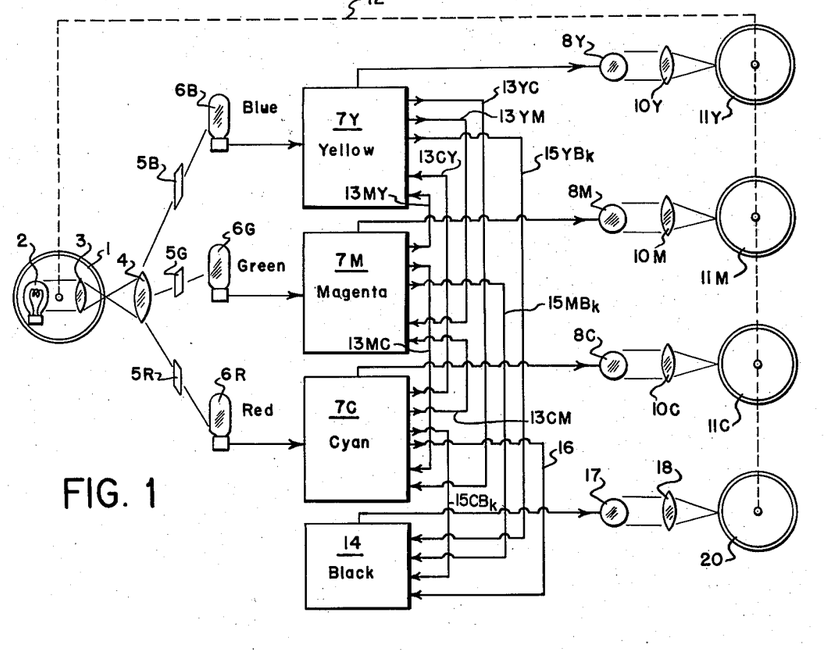
FIG. 1 is a schematic representation of apparatus for making color printers from an original photographic image.

Referring now to FIG. 1, there is shown a schematic representation of complete apparatus for the production of color printers by the color subtraction process from an original color transparency or print. In this figure we also show the manner in which the various components of the apparatus are interconnected. The method underlying the apparatus is one based upon color separation of the primary colors blue, green and red and upon the color subtraction system wherein blue is constituted of magenta and cyan, green is constituted of yellow and cyan, and red is constituted of magenta and yellow. In this process the colors yellow, magenta and cyan are considered the complementary colors of the primary colors blue, green and red.

At 1 in FIG. 1 there is illustrated a rotating drum on which is mounted a color transparency to be scanned and ultimately reproduced by photographic or printing processes from the color printers made by the apparatus. The drum 1 is driven about its axis at a constant rate by any suitable means and is also made to move axially at a constant rate by means such as a lead screw. Mounted within the drum are a suitable light source 2 and a condensing optical system represented by the lens 3. This lens focuses the light from the source 2 at a point on the surface of the rotating drum 1 so that as the drum is rotated about its axis and is moved axially every element of the transparency is illuminated in sequence.

The light passing through the successive elemental areas of the transparency as it is scanned is dispersed by an optical system 4 and is projected onto a system of filters each of which is placed in the beam so that the light incident on them is of the same intensity. One of the filters 5B transmits only the blue light incident upon it and filters out red and green. The light transmitted by this filter is directed onto the light sensitive element of a photoelectric transducer 6B, the spectral response of which is selected to be responsive to the light passed through the filter 5B. Similarly, the light passed through the filter 5G is directed onto a photoelectric transducer 6G and the light passed through the filter 5R is directed onto a photoelectric transducer 6R. The output signals of each of the transducers 6B, 6G, and 6R are the input signals to three separate color computing channels. Since these channels ultimately produce output signals which are individually used to photographically reproduce printers corresponding to the original scanned image in the complementary colors yellow, magenta and cyan, respectively, of the primary colors blue, green and red, all elements in the several computer channels will be identified by the postscripts Y, M or C where it is necessary to distinguish among similar components in the several channels. Hence, the yellow color channel is designated generally as 7Y, the magenta color channel is designated 7M and the cyan channel is designated 7C.

The output signals of the three color computing channels energize glow modulator tubes 8Y, 8M and 8C, respectively, which are known devices for producing a light output the intensity of which is substantially proportional to the current through the tube. The light output from these glow tubes is directed through convergent optical systems schematically represented at 10Y, 10M and 10C. These optical systems focus the light onto photosensitive surfaces on drums 11Y, 11M and 11C. Each of these drums is rotated about its axis and translated axially in exact synchronism with the rotation and translation of the drum 1 in the scanning system. Any suitable mechanical or electromechanical mechanism, represented schematically by the broken line 12, may be used to effect this synchronous rotation and translation of the drums.

Each of the color computing channels takes from as well as sends to each of the other computing channels a signal which is used in developing the ultimate output signal from each channel. For example, a connection 13YM delivers a signal from the yellow channel to the magenta channel and a connection 13MY delivers a signal from the magenta channel to the yellow channel. Note that the channels of origin and destination of a connection are signified by the sequence of letters following the reference number, e.g. 13YM signifies a connection carrying a signal from the yellow channel to the magenta channel. There are similarly designated connections from each of the color channels to every other channel.

As explained in the general statement of the invention the system also includes means for producing, in addition to the three color printers, a black printer which is essentially a fourth separate image of the original image. This black printer reproduces all the black, white and varying shades of gray and in addition supplies the so-called neutral density for the ultimate reproduction produced by the superimposition of the three color printers and the black printer. The exposure of the black printer is effected by a black computing channel 14 which utilizes signals from each of the three color computing channels. The signals are connected to the black computing channel through connections 15YB$_k$ from the yellow channel to the black channel, 15MB$_k$ from the magenta channel to the black channel and 15CB$_k$ from the cyan channel to the black channel. Additionally, there is a reference signal which as will be explained below may be derived from any one of the color computing channels. In this embodiment the reference signal is derived from the cyan computing channel 7C and is connected through the lead 16 to the black channel 14.

The output signal from the black channel 14 is used to energize a glow tube 17 and the light from this tube is focused by a lens system 18 on a photosensitive surface carried by the drum 20. This drum is rotated about its axis and translated axially in synchronism with scanning drum 1 in the same manner as drums 11Y, 11M and 11C.

As previously stated, the color computing channels 7Y, 7M and 7C are identical in all respects and it will therefore only be necessary to describe one of them in detail to fully illustrate every aspect of our invention. The circuit diagram for one of these channels is shown in detail in FIG. 2. It will be convenient to consider individual sections of that figure separately. Accordingly, the components in the section to the left of broken line 21 will hereafter be referred to as the densitometer section. The section between broken lines 21 and 22 will be referred to as the computing section and the section to the right of broken line 22 will be considered the undercolor removal section. The section circumscribed by the broken lines 23, 24, 25 and 26 will be referred to as the modulator-amplifier-demodulator section and the section circumscribed by the broken lines 24, 25, 26 and 27 will be referred to as the glow tube driver section.

Figure 2:
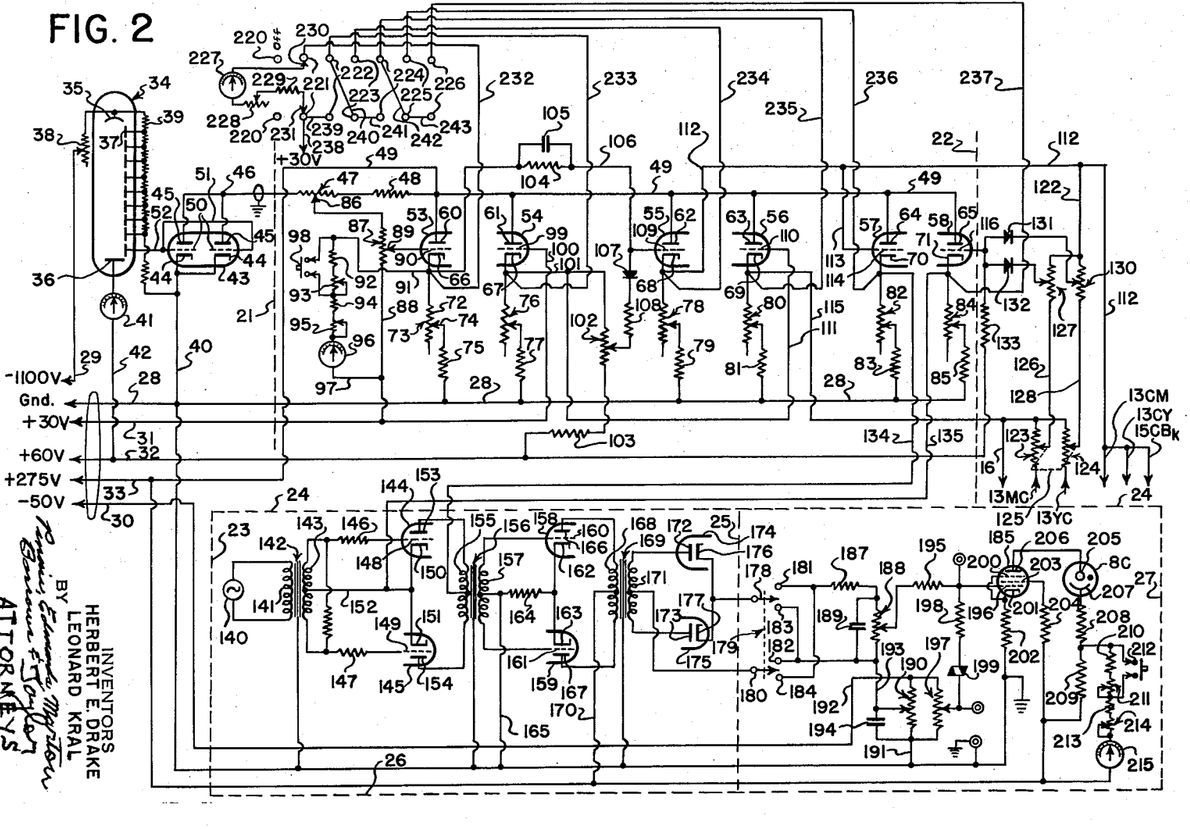
FIG. 2 is a schematic circuit diagram of electronic apparatus used in the apparatus shown in FIG. 1.

The apparatus shown in FIG. 2 is energized from a power supply which provides a high-quality ground 28 and suitable voltages above and below ground potential. For the particular components used in this embodiment there is required a source 29 of voltage 1100 volts below ground, a source 30 which is 50 volts below ground and sources 31, 32 and 33 which are respectively 30 volts, 60 volts and 275 volts above ground.

Referring now to the densitometer section to the left of broken line 21 in the upper portion of FIG. 2, we convert the light transmitted through the filter, e.g. 6R, to an electrical signal by means of a conventional photomultiplier tube 34. As is well known, such a tube comprises a photosensitive cathode 35 on which the light is directed. Light impinging on this cathode causes it to emit electrons which are attracted to the first of a plurality of dynodes 37. When properly energized at successively higher potentials, an electron impinging on the first of the dynodes causes the emission of more than one secondary electron. These are in turn attracted to the adjacent dynode at the next higher potential. This multiplication of electrons continues at each dynode. Finally the electrons emitted by the last dynode are attracted to the anode 36.

The cathode 35 is held at a potential very much below ground through connection 29 to the slider on a variable resistance 38. The resistance element is in turn connected to the cathode 35. The several dynodes 37 are held at successively higher potentials with respect to the cathode by means of a voltage divider consisting either of a series string of fixed resistances 39 or a single resistance tapped at appropriate points. This voltage divider is connected between the cathode 35 and the high-quality ground through a connection 40.

The anode 36 is connected to a suitable potential above ground, in this case 60 volts, through ammeter 41 and the connection 42.

The densitometer section also comprises a triode vacuum tube which operates as a non-linear amplifier. Although not essential, it is preferable to connect the two triode sections of a duo-triode tube 43 in parallel so that the tube acts effectively as a single triode. We have found that this arrangement gives better stability when using commercially available tubes under the conditions specified. The cathodes 44 are connected directly to ground through the connection 40 and the anodes 45 are connected together as at 46 and are supplied with potential through the resistance element of a potentiometer 47 connected in series with a fixed resistance 48 which is connected in turn to the positive 275 volt source through lead 49. The grids 50 of the two sections of duo-triode 43 are connected together by lead 51 and are connected as shown at 52 directly to the ninth dynode of the photomultiplier tube 34.

Now, it is known that when the grid of a vacuum tube is negative with respect to the cathode a current will flow from the grid of the tube. See, for example, Radiation Laboratory Series: Vacuum Tube Amplifiers, vol 18, page 418 et seq., published by McGraw-Hill Book Company, Inc. (1948).

We have found that if a tube such as a 12AX7 is connected as shown in FIG. 2 and is operated at the voltages indicated the grid current will vary directly as the current at the ninth dynode of the photomultiplier tube. Because the dynode current itself is directly proportional to the light impinging on the cathode 35, it follows that the grid current in the duo-triode 43 will be proportional to the light incident on the cathode of the photomultiplier. Because the grid voltage of the duo-triode is proportional to the logarithm of the grid current, the plate voltage on the duo-triode and hence the current in the plate circuit, including the potentiometer 47 and the resistance 48, will be linearly proportional with respect to the optical density of the original transparency, thus forming an accurate and sensitive densitometer circuit.

It will be readily understood that the signal represented by the current in the plate circuit of the duo-triode 43 is related only to the intensity of the light incident on the cathode 35. As previously explained the intensity of the light falling on the cathode 35 is dependent upon the amount of light transmitted through the color transparency or reflected from the print and which falls within that portion of the spectrum transmitted by the filters 5B, 5G, 5R. Thus, the variations in the plate current in the plate circuit of the duo-triode vary over a range representative of complete absence of a particular color component, here called the "black" condition, to the other extreme in which the color component in the transparency or print is present in maximum amount, the so-called "white" condition. To illustrate this action in concrete terms, suppose the portion of a transparency being scanned is completely clear and transmits all of the white light incident upon it from the source. The transmitted light, not having had any spectral components filtered out by the transparency itself, would then impinge upon the cathodes of the photomultiplier tubes 6B, 6G and 6R after passing through the filters 5B, 5G and 5R, respectively. The currents in the three photomultiplier tubes are equal and each is at its maximum value. As a consequence the plate current of the duo-triode 43 is also maximum and the voltage drop along the resistance element of the potentiometer 47 is maximum.

On the other hand, if the area of the transparency being scanned were black no light would be transmitted to the photomultiplier tubes and the currents in them would be zero or minimum value. Accordingly, the current in the plate circuit of the duo-triode and, hence, the voltage drop through the potentiometer 47 would also have minimum values.

With these two illustrations in mind, it will be readily apparent that scanning a section of a transparency which is predominantly blue will result in maximum current through the potentiometer 47 in the plate circuit of the densitometer section in the channel 7Y shown in FIG. 1, whereas there will be zero or minimum current in the corresponding potentiometers in the channels 7M and 7C will have minimum or zero values. In an analogous manner scanning an area of a transparency which is a color made up of different amounts of two or more of the primary colors blue, green and red will cause corresponding responses in the densitometer sections of the channels 7Y, 7M and 7C.

The computer section of the channel, namely that part represented schematically between the vertical broken lines 21 and 22 in the upper portion of FIG. 2, has as its active elements six triode vacuum tubes 53, 54, 55, 56, 57 and 58. These are arranged in pairs and each pair is connected as balanced cathode followers. One of the triodes of each pair develops a highly stable voltage against which a varying signal voltage developed in the other triode of the pair is referenced. The output signal of each pair of cathode followers is the difference in voltage between their respective cathodes. The balanced cathode followers possess several features which are particularly advantageous in this and similar applications. Considered individually, each of the triode sections has the known features of low output impedance and relatively good power output. Taken together the triode sections of each pair retain these features and additionally produce a signal which is referenced not against a ground external to the pair, but against an internally developed reference voltage. This provides an output signal from each pair which varies with respect to a very stable reference; consequently, the output signal itself is highly accurate.

Turning now to a detailed description of the circuitry the plates numbered 60 through 65 of the triodes 53 through 58, respectively, are connected directly to the +275 volt source 33 through the lead 49. Each of the cathodes 66 through 71 is connetced to the high-quality ground 28 through a series combination consisting of a variable resistance and a fixed resistance, the former providing for adjustment of the load on each tube. For example, the cathode 66 of the triode 53 is connected to one end of the resistance element 72 of a variable resistance 73. The movable tap 74 is then connected to ground 28 through a fixed resistance 75. The cathodes of the other triodes are similarly connected to ground 28: cathode 67 through variable resistance 76 and fixed resistance 77; cathode 68 through variable resistance 78 and fixed resistance 79; cathode 69 through variable resistance 80 and fixed resistance 81; cathode 70 through variable resistance 82 and fixed resistance 83; and cathode 71 through variable resistance 84 and fixed resistance 85.

The signal from the densitometer circuit is taken off the resistance element of the potentiometer 47 at the movable tap 86 which is connected to the upper end of the resistance element of a potentiometer 87. The lower end of the resistance element is connected through the lead 88 to the +30 volt source 31. This arrangement acts as a variable voltage divider with the movable tap 89 of the potentiometer 87 being connected directly to the grid 90 of the triode 53. As will be explained in greater detail below, the potentiometer 47 and potentiometer 87 are respectively the "white" and "black" adjustments and serve effectively to establish the contrast, i.e. the difference in amplitude between a signal of maximum intensity and a signal of minimum intensity.

Means for making the proper settings of potentiometers 47 and 87 are provided. This consists of a voltmeter circuit connected by the lead 91 from the cathode 66 of triode 53 to the upper end of a series string of resistances 92, 93, 94, 95. The resistances 92 and 94 are fixed resistances while the resistances 93 and 95 may be the resistance elements of potentiometers which have their movable taps connected to the low potential end of the resistance element. A suitable voltmeter 96 is connected between the bottom end of resistance element of potentiometer 95 and the +30 volt source through lead 97. A normally open push-button 98 is connected in shunt to resistances 92 and 93. The method of using this circuit to adjust the "white" and "black" potentiometers will be described in detail following the description of the circuitry.

As previously stated the output signal of each of the pair of triodes connected as balanced cathode followers is a voltage which is referenced against an internally developed reference voltage. In the first balanced cathode follower the reference voltage is developed at the cathode 67 of triode 54. This cathode is made to have a constant potential by connecting the grid 99 of the triode to the +30 volt source 31 through the lead 100. The cathode 67 is also connected by the lead 101 to the +60 volt source 32 through the resistance element of a potentiometer 102 connected in series with a fixed resistance 103. This provides an accurately adjustable bias voltage for a purpose to be described.

The potential of cathode 66 of triode 53 is transferred by a lead from the cathode through a time constant circuit comprising resistance 104 in shunt with capacitance 105 and then through a lead 106 to the negative side of a diode 107. The positive side of this diode is connected through the resitsance 108 to the movable tap on potentiometer 102. The time constant of the resistance-capacitance combination is relatively short in comparison to the duration of the signals to be carried in the channel and serves as a frequency accentuator for accentuating the fine detail of the picture being scanned. The diode 107 serves as a tone compensator for the "highlight" detail in the picture being scanned. Typical values for these components and a detailed description of their functions will be given below.

The output signal of the first pair of balanced cathode followers is taken from the cathode of diode 107 and connected directly to the grid 109 of triode 55, the first of the pair of triodes comprising the second balanced cathode follower. Reference voltage in this balanced cathode follower is developed at the cathode 69 of triode 56 which has its grid 110 connected through lead 111 to the reference potential at the cathode 67 of triode 54. The varying signal potential at the cathode 68 of triode 55 is taken off through the lead 112 and is connected through the lead 113 to the grid 114 of triode 57. The stable reference potential developed at the cathode 69 is taken off through lead 115 and is used as a reference potential in the undercolor removal circuitry. The circuitry will be described now and its function will be set forth in detail below.

The third balanced cathode follower utilizes a second variable input signal rather than the stabilized reference potential as in the case of the two preceding balanced cathode followers. This second variable voltage is applied to the grid 116 of the triode section 58, and is developed as a result of cooperation among the three color channels. First, it should be noted that the signal applied to the grid 114 of triode section 57 is also carried on the line 112 to three outgoing connections indicated at 13CM, 13CY and 15CB$_k$. These correspond to the similarly designated connections in FIG. 1. The lead 13CY is connected to the yellow channel, the lead 13CM is connected to the magenta channel and the lead 15CB$_k$ is connected to the black channel. Each of the other color channels, but not the black channel, has similar output lines going to every other color channel as well as to the black channel. As an example, the incoming connection 13MC is a connection similar to outgoing connection 13CM except that it comes in from the magenta channel to the cyan channel which is here being described. Similarly, the incoming connection 13YC is a connection similar to 13MC except that it is coming in from the yellow channel.

The cyan signal on lead 112 is also taken off on the lead 122 and is combined with the incoming magenta and yellow signals in the following circuitry. The magenta signal on lead 13MC is connected to one end of the resistance element of a potentiometer 123, the other end of the resistance element being connected to the stabilized reference voltage on the lead 115 from the cathode of triode section 56. In a similar manner the incoming yellow signal on the lead 13YC is connected to one end of the resistance element of a potentiometer 124 and the other end of this resistance element is also connected to the lead 115. The movable taps of the two potentiometers 123 and 124 are ganged together as indicated by the dotted line at 125. Obviously, now, current will flow in the resistance elements of potentiometers 123 and 124 according to the differences in potential between the incoming magenta and yellow signals and the stable reference potential at the cathode 69.

The voltages developed across the resistance elements of the potentiometers 123 and 124 are taken off at the movable taps of these two potentiometers. The voltage of the movable tap on the potentiometer 123 is then weighed against the cyan signal voltage on the line 112 by connecting the movable tap of the potentiometer 123 to one end of the resistance element of a potentiometer 127 and by connecting the other end of this resistance element to the lead 112. Similarly, the voltage at the tap of the potentiometer 124 is weighed against the cyan signal voltage on the line 112 by connecting the tap of the potentiometer 124 through lead 128 to the lower end of the resistance element of a potentiometer 130 and by connecting the upper end of this resistance element to the lead 112 through lead 122. The currents in the resistance elements of the potentiometers 127 and 130 are respectively proportional to the differences in the voltages applied to the opposite ends of the resistance elements of these potentiometers.

A comparator circuit is now used to select and apply one of the voltages developed across any selected part of the potentiometers 127 and 130 to the grid 116 of triode section 58. This comparator section consists of a pair of diodes 131 and 132. The anodes of these two diodes are both connected to the grid 116 of triode 58. The cathode of the diode 131 is connected to the movable tap of potentiometer 130 and the cathode of the diode 132 is connected to the movable tap of potentiometer 127. The anodes of the diodes as well as the grid 116 are connected to the +60 volt source 32 through a resistance 133. The resistance 133 has a relatively high value and in a typical circuit will be in the order of 2 megohms and is so high that the +60 volts acts merely as a starter for the diode. If two different voltages are applied to these diodes, for instance, 15 volts on one and 10 volts on the other, the voltage drop through the 2 megohms of the resistor would be so great that the effect is that the cathode having higher voltage becomes non-conductive, while the cathode having the lower voltage conducts. Accordingly, the grid 116 of the triode 58 would have 10 volts applied to it. The effect and purpose of this action will be described in greater detail at a later point.

The output signal from the computer section of the channel is the difference in voltage between the cathode 70 of the triode 57 and the cathode 71 of the triode section 58. These two voltages are taken off through the lines 134 and 135, respectively, and is the input voltage to a novel modulator-amplifier-demodulator circuit by which the D.C. signal strength is raised to a sufficient level to control the driver circuit for the glow modulator tube.

A signal generator 140 of any suitable kind produces a substantially pure sine wave voltage having a frequency of approximately 8,000 cycles per second. The signal generator is connected across the primary winding 141 of an interstage transformer 142. Amplitude modulation of the A.C. voltage across the secondary winding 143 of the transformer 142 is effected in a pair triodes 144 and 145. The opposite ends of the secondary 143 are connected through resistances 146 and 147 to the grids 148 and 149 of the triodes 144 and 145 while the cathodes 150 and 151 are connected through the lead 152 to the center tap of the secondary winding 143. The plates 153 and 154 of the triodes 144 and 145 are connected to the opposite ends of primary winding 155 of an interstage transformer 156. Note now that there is no separate source of plate potential for the triodes 144 and 145. The voltage on the line 134 from the cathode of the triode 57 being the greater of the two cathode voltages, as will become apparent below, is connected to the center tap of the primary winding 155 and the voltage on the line 135 from the cathode of the triode 58 is connected to the cathodes 150 and 151 of the modulator tubes. As is now apparent to those skilled in the art the voltage across the primary winding 155 is an 8,000 cycle signal which is amplitude modulated in accordance with variations in the D.C. output signal voltage from the computer section.

The amplitude modulated signal appears in the secondary winding 157 of the coupling transformer 156 and is used as the input voltages to a pair of triodes 158 and 159 by connecting the opposite ends of the secondary winding to the grids 160 and 161. The cathodes 162 and 163 are connected together and are connected to the center tap of the secondary winding 157 through a resistance 164. The center tap of the secondary 157 is also connected to the system ground through the lead 165. Anodes 166 and 167 of the triodes 158 and 159 are connected to the opposite ends of the primary winding 168 of an interstage transformer 169. The center tap of the primary 168 is connected through the lead 170 to the +275 volt supply.

The amplified signal developed in the secondary 171 of the interstage transformer 169 is supplied to the anodes 172 and 173 of a pair of vacuum tube diodes 174 and 175 and the cathodes 176 and 177 of these diodes are connected together and to one pole 178 of a double-pole double-throw switch 179. The center tap of the secondary winding 171 is connected to the other pole 180 of the switch 179.

An amplified and demodulated voltage exactly proportional to the signal voltage appearing between the cathodes 70 and 71 of the final balanced cathode follower stage in the computer section appears across the two poles of the switch 179. As will be apparent from the following description of the circuitry this switch 179 serves as a means for enabling the operator to expose the printers either as photographic negatives or as photographic positives. The pole 178 connected to the cathodes of the demodulator is positive with respect to the pole 180 which connects the center tap of the secondary of transformer 169. The switch points of the switch 179 are accordingly arranged so that the voltage appearing between the movable contacts 178 and 180 may be connected either across the switch points 181, 182 or across the points 183, 184 depending on the position of the switch. Switch point 183 is connected to switch point 182 and switch point 184 is connected to switch point 181.

Switch points 181 and 182 are effectively the input terminals to the control circuit for the power amplifier tube 185 which drives the glow tube 8C also shown in FIG. 1. Effectively connected across the switch points 181 and 182 are a fixed resistor 187 in series with a resistance element of a potentiometer 188. Capacitor 189 is shunted across the resistance element of the potentiometer. Means are provided for applying an appropriate negative bias to the voltage developed across the resistance element of the potentiometer 188. A suitable circuit for this purpose comprises a potentiometer 190, the resistance element of which is connected through lead 191 to the system ground and through lead 192 to the −50 volt source 30. The movable tap of potentiometer 190 is connected to the bottom end of potentiometer 188 through the lead 193 and a capacitor 194 is connected between the movable tap of potentiometer 190 and the end of the resistance element of the potentiometer which is connected to ground.

Signal voltage for the amplifier tube 185 is taken from the movable tap of potentiometer 188 and is connected through a resistance 195 to the control grid 196 of the tube. The resistance element of a potentiometer 197 is connected between system ground through lead 191 and the negative 50 volt source through lead 192. There are connected in series between the control grid 196 and the movable tap of potentiometer 197 a fixed resistance 198 and a varistor 199. Varistors have a non-linear resistance characteristic which decreases with an increase in applied voltage. A suitable varistor for this particular embodiment is identified commercially as type 838G118G2. As shown, the suppressor grid 200 of the power amplifier tube 185 is connected to the cathode 201 and the cathode is connected to ground through a resistance 202. This screen grid 203 of tube 185 is connected to the +275 volt supply through resistance 204.

The glow tube 8C has its anode 205 connected to the anode 206 of the amplifier tube 185 and the cathode 207 of the modulator tube is connected through a fixed resistance 208 is series with a fixed resistance 209 to the +275 volt supply.

A test circuit for establishing the proper current through the glow tube 8C includes a fixed resistance 210 and a potentiometer connected as a variable resistance 211. A normally open push-button 212 is connected from the top end of the fixed resistance 210 where it is connected to the junction between the resistances 208 and 209 and to the bottom end of the resistance element of potentiometer 211 where the movable tap of the potentiometer is also connected. Another series combination of a fixed resistance 213 and the resistance element of a potentiometer 214 is connected between the lower end of potentiometer 211 and the +275 volt source 33 through an milliammeter 215.

A series of test circuits is also provided for establishing the proper balances in the balanced cathode followers of the computer section. A two-pole multi-throw switch having pairs of contact points 220, 221, 222, 223, 224, 225 and 226 provides a convenient means for rapidly switching a voltmeter 227 into each of the several cathode circuits. The meter is connected in a series circuit including a variable resistance 228 and a fixed resistance 229 between the movable contacts 230 and 231 of the selector switch. The fixed resistance 229 provides the approximate amount of resistance in the meter circuit necessary to bring the operating range within the range of voltages to be encountered within the circuit and the variable resistance 228 serves as a calibration resistance.

The first pair of contact points 220 are not connected in any external circuit. These provide an "off" switch position for the meter 227. The uppermost switch contact of each pair of contacts 221, 222, 223, 224, 225 and 226 is connected to the cathode of one of the triodes 53, 54, 55, 56, 57 and 58 through connections 232, 233, 234, 235, 236 and 237. As an illustrative example, the upper switch contact of the pair of switch contacts 221 is connected through lead 232 to the cathode 66 of triode 53.

The lower contact of the pair of switch contacts 221 is connected to the +30 volt source through lead 238 and is also connected to the lower switch contact of the pair of switch contacts 222 by a jumper connection 239. As will be explained in greater detail below, the proper operating voltage of cathodes 66 and 67 of the triodes 53 and 54 are first established and then the cathode potentials of all subsequent triodes in the balanced cathode followers are established with reference to these potentials.

Accordingly, the upper contact of the pair of contacts 222 is connected by a jumper 240 to the lower contacts of the pair 223 and this latter contact is also connected by a jumper 241 to the lower contact of the pair 224. Similarly, the upper contact of pair 224 is connected to the lower contact of pair 225 by a jumper 242 and the lower contact of pair 225 is connected by a jumper 243 to the lower contact of pair 226.

This completes the description of the circuit components and their relation to each other in the cyan channel. The cyan channel is in all respects typical of the magenta and yellow channels. To enable those skilled in the art to reconstruct this illustrative embodiment of the invention we give the following typical values of components which may be used. The active components such as vacuum tubes and diodes may be as follows.

| Reference number: | Type |
|---|---|
| 34 | 931A |
| 43 | 12AX7 |
| 53, 54, 55, 56, 57, 58 | ½ 12AT7 |
| 107, 131, 132 | 1N54A |
| 144, 145, 158, 159 | ½ 12AU7 |
| 174, 175 | ½ 12AL5 |
| 185 | 12AQ5 |
| 186 | R1130B |

The resistances and capacitances may be as follows.

| Reference number: | | Value |
|---|---|---|
| 38 | ohms | 100K |
| 39 | do | 68K |
| 47 | do | 100K |
| 48 | do | 320K |
| 87 | megohms | 5 |
| 73, 76, 78, 80, 82, 84 | ohms | 2.5K |
| 75, 77, 79, 81, 83, 85 | do | 3.3K |
| 102 | do | 5K |
| 104 | do | 100K |
| 108 | do | 30K |
| 123, 124 | do | 25K |
| 127, 130 | do | 100K |
| 133 | megohms | 2 |
| 146, 147 | ohms | 2K |
| 164 | do | 680 |
| 187 | do | 5.6K |
| 188 | do | 25K |
| 190, 197 | do | 10K |
| 195 | do | 100K |
| 198 | do | 51K |
| 202 | do | 180 |
| 204 | do | 5.1K |
| 208 | do | 1000 |
| 209 | do | 100 |
| 105 | mf | .003 |
| 189 | mf | .005 |
| 194 | mf | .1 |

The coupling transformers may be as follows.

| Reference number: | Type |
|---|---|
| 142 | UTC A20. |
| 156 | Triad HS-27. |
| 169 | Triad HSM-31. |

The black channel 14 illustrated schematically in FIG. 1 does not develop any signal which corresponds directly to light colors and values being transmitted through the transparency to be reproduced as do the color channels 7Y, 7M and 7C each of which has its own photoelectric input. Rather, the black channel utilizes and responds only to signals which are developed in the three color channels. It compares the three signals coming in from the color channels and develops an output signal which is related to the significant signals selected from the comparison of the three incoming signals and that significant signal is converted into light to expose a photosensitive surface carried by the drum 20. The resultant photographic image is then used to produce a half tone printing plate to print the blacks, grays and neutral density of the reproduction.

According to our invention the black channel has no densitometer section corresponding to the densitometer sections of the color channel shown in FIG. 2. It does have a computer section having one balanced cathode follower similar in many respects to the balanced cathode follower comprising the triode 57, 58 in FIG. 2.

The computer section of the black channel does develop an output signal which is impressed on a modulator-amplifier-demodulator circuit. As in the color channels the demodulator provides an amplified signal for a glow tube driving circuit. The modulator-amplifier-demodulator circuit and the driver circuit may be identical in all respects to that portion of the circuitry in FIG. 2, lying within the broken lines 23, 24, 26 and 27.

Figure 3:
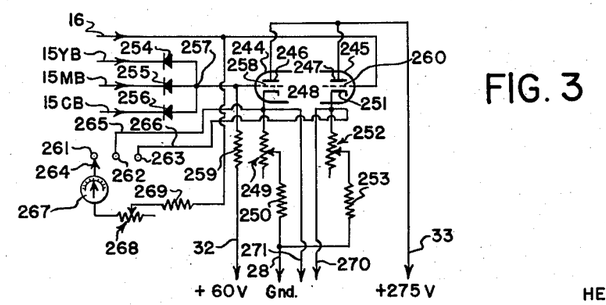
FIG. 3 is a schematic circuit diagram of electronic apparatus used in the apparatus shown in FIG. 1.

Referring now to FIG. 3 the circuitry shown schematically constitutes the entire computer section of the black channel. It receives an input signal from each of the three color channels 7Y, 7M and 7C and its output is, as stated, impressed on a modulator.

There are three input connections to the black computer section. These are $15YB_k$, $15MB_k$ and $15CB_k$ which are the same as the connections having the same reference numerals shown in FIG. 1. Moreover, the connection $15CB_k$ in FIG. 3 is the same as the connection $15CB_k$ in FIG. 2 and it will be understood that the connections $15YB_k$ and $15MB_k$ are respectively connections corresponding to connections $15CB_k$ in the yellow and magenta channels.

The black computer section also utilizes a reference voltage brought in on the connection 16 is the same as the connection 16 shown in FIG. 2. It will be understood that this reference voltage which in this illustrative embodiment is taken from the cathode 69 or triode section 56 in FIG. 2 could as well be derived from the corresponding cathode in either the yellow or the magenta channels. This is so because, when all channels are properly adjusted, the voltage at the cathode 69 will be exactly the same as the cathode voltage of the corresponding triode in either of the yellow or the magenta channels.

The computer section of the black channel comprises a pair of triode vacuum tubes 244 and 245 and these are connected together to form a balanced cathode follower which is similar to the balanced cathode followers described in connection with FIG. 2. The plates 246 and 247 of these triodes are connected through the +275 volt source through the lead 33 which corresponds to the lead 33 in FIG. 2. The cathode 248 of triode 244 is connected to one end of the resistance element of a variable resistance 249 and the movable tap of this variable resistance is connected to the system ground 28 through a fixed resistance 250. Similarly, the cathode 251 of triode 245 is connected to one end of the resistance element of a variable resistance 252 and the movable tap of this variable resistance is connected to the system ground 28 through a fixed resistance 253.

The incoming signals from the yellow, magenta and cyan color channels are compared in a circuit comprising diodes 254, 255 and 256, the connection 15YB being connected to the anode of diode 254, the connection 15MB being connected to the anode of diode 255, and the connection 15CB being connected to the anode of diode 256. The cathodes of the diodes are connected together at the junction 257 and this junction is connected to the grid 258 of the triode 244. Proper bias on the grid 258 is provided through a fixed resistance 259 connected to the +60 volt source 32.

The reference voltage on the connection 16 is impressed on the grid 260 of the triode 245. Accordingly, the potential of cathode 251 will remain constant at a value determined by the position of the movable tap of the variable resistance 252 and by the value of the reference voltage on the connection 16.

A meter circuit is provided for establishing the proper voltages in the two triode sections of this balanced cathode follower. This circuit consists of a single-pole multi-throw switch having contact points 261, 262, 263 and a movable contact 264. The contact point 261 is not connected to any external circuitry and this provides an "off" position. The contact point 262 is connected through lead 265 to the cathode 248 of triode 244 and the contact point 263 is connected through the lead 266 to the cathode 251 of triode 245. A suitable voltmeter 267 is connected between the movable contact 264 of the switch and one end of the resistance element of a variable resistance 268. The movable tap of this variable resistance is connected through a fixed resistance 269 to the lead 16 carrying the reference voltage from the cyan channel.

The output from this computer section of the black channel is, as in the case of the output from the balanced cathode followers in the color channels, the difference in potential between the cathodes 248 and 251 of the triodes 244 and 245. These potentials are taken off through the lead 270 from the cathode 251 and the lead 271 from the cathode 248. These leads serve as the input connections to the black channel modulator-amplifier-demodulator section. The latter section is not illustrated, but it is sufficient to say that it is similar in all respects to the modulator-amplifier-demodulator section shown in FIG. 2 between the broken lines 23, 24, 25 and 26. In the black channel the lead 270 corresponds to the lead 134 in FIG. 2 and the lead 271 corresponds to lead 135 in FIG. 2. As previously stated, the modulator-amplifier-demodulator section is followed by a glow tube driver section corresponding in all respects to the driver section shown in FIG. 2 within the broken lines 24, 25, 26 and 27.

Typical components and values for the circuitry shown in FIG. 3 are as follows.

| Reference number: | Type or value |
| --- | --- |
| 244, 245 | ½ 12AT7 |
| 254, 255, 256 | 1N54A |
| 249, 252 | ohms 2.5K |
| 250, 253 | do 3.3K |
| 259 | megohms 2.0 |

The components of the black channel modulator-amplifier-demodulator section and of the black channel glow tube driver section may be the same as the corresponding components of the similar circuitry in the color channels. Typical component types and values are given in the description of FIG. 2.

Having described the construction of an illustrative embodiment of our invention we will now describe the method of adjustment and the operation of the circuit.

The densitometer comprising the photomultiplier tube 34 and the duo-triode 43 is used for converting the picture density, or in other words, the light of one of the primary colors transmitted through the original transparency being scanned into linear voltage variations which are representative of the picture density. As previously explained, light incident on the cathode 35 of the photomultiplier tube 34 causes current to flow in the photomultiplier tube and this current is directly proportional to the intensity of light incident on the cathode. With the grids 50 of the duo-triode 43 connected directly to the ninth dynode of the photomultiplied tube these grids draw current which is directly proportional to the light incident on the cathode of the photomultiplier tube. Because the duo-triode 43 is being operated as a logarithmic device the potentials of the plate 45 will vary in a manner which is linearly proportional to the density of that primary color of the picture area being scanned to which the photomultiplier tube is responsive. Referring to FIG. 1 the photomultiplier tube 6B is responsive to the blue light transmitted or reflected from the picture being scanned; hence, the plate current in the duo-triode 43 of the channel 7Y will be proportional to the density of the blue, if any, being scanned. Similarly, the plate current in the duo-triode 43 of the channel 7M will be proportional to the green, if any, being scanned and the plate current in the duo-triode 43 of the channel 7C will be proportional to the red, if any, being scanned.

It will be apparent to those skilled in the art that there is no characteristic of the plate current—the signal—in any of the duo-triodes 43 of the channels 7Y, 7M or 7C which is uniquely related to a color as such. Rather, these signals will be merely representative of the variations in density of the colors which the several tubes are responsive and therefore the magnitudes of the signals can be thought of merely as variations of a range of grays bounded at one end by "white" and at the other end by "black." Accordingly, adjustment of the various sections of the computer will be spoken of in terms of "white" and "black."

The first adjustment to be made in each of the three color channels 7Y, 7M and 7C is the adjustment of the triode section 54 of the first balanced cathode follower. As shown in FIG. 2 the grid 99 of this tube is connected to the +30 volt source. The selector switch in circuit with the meter 227 is set so that the movable contacts 230 and 231 are in contact with the pair of switch contacts 222. The variable resistance 76 of the cathode circuit of the tube 54 is then adjusted so that the plate cathode current through this tube causes the cathode voltage to be 32 volts, 2 volts above the fixed grid voltage. The selector switch for the meter 227 is then set so that the movable contacts 230, 231 are across the pair of switch contacts 221 and the "white" and "black" adjustments are made.

The first adjustment to be made to each of the channels is to set the balanced cathode followers for proper operating conditions. The meter 227 and its associated circuitry is used for this purpose. The meter switch is first set so that the movable contacts 230 and 231 are across the pair of switch contacts 221. As previously noted the grid 90 of the triode 53 is connected to the +30 volt source through the resistance of the potentiometer 87 and the lead 88. This puts the grid 90 at 30 volts when there is no signal, i.e. no current in the plate circuit of the duo-triode 43. The variable resistance 73 in the cathode circuit of the triode 53 is then set so that the potential of cathode 56 is 2 volts above the potential of grid 90, that is, 32 volts. The meter switch is then set so that the movable taps 230 and 231 are across the pair of switch contacts 222. The grid 99 of triode 61 is also connected to the +30 volt source and by adjustment of the variable resistance 76 in the cathode circuit of this triode the potential of cathode 67 is adjusted so that it, too, is 2 volts above the grid potential, again 32 volts. Thus, with no signal on the grid 90 of the triode 53 there will be no difference in potential between the cathode 66 of triode 53 and the cathode 67 of triode 54, a balanced condition. This adjustment of the cathode potentials will not need to be repeated frequently, as only component aging or tube substitution is likely to cause the balance between the two triode sections to be changed.

The "white" and "black" levels which establish the maximum contrast to be reproduced are then set by adjustment of the potentiometers 47 and 87. To adjust for the maximum "white" to be reproduced the movable tap 89 of potentiometer 87 is set at the top of the resistance element so that grid 90 is connected directly to the movable tap 86 of potentiometer 47. A specimen transparency having actual white or clear segment and an actual black segment is then mounted on the drum 1 of FIG. 1 and the white segment is scanned. This causes a "white" signal in each of the channels 7Y, 7M and 7C due to maximum response of the corresponding photomultiplier tubes 6B, 6G and 6R; that is to say, scanning an actual white or clear segment results in light of maximum intensity being transmitted through the filters 5B, 5G and 5R. Pushbutton 98 is then pushed in to establish a connection across its contacts. Movable tap 86 of the potentiometer 47 is set so that there is no difference in potential between the cathodes 66 and 67 with the maximum "white" signal.

Now a black segment of the transparency is scanned and with the push-button 98 open the movable tap 89 of the potentiometer 87 is adjusted until the meter 96 reads 22 volts above the reference voltage of +30 volts. This puts the two cathodes at a 20 volt differential; that is, cathode 66 is 20 volts above cathode 67. It follows that the output signal of the first balanced cathode follower, which is the difference in potential between the cathode 66 and 67, may vary between 0 volts when scanning white and 20 volts when scanning black. It will be immediately recognized that the same voltage variation obtains in any one of the channels if the transparency being scanned is actually the color to which the photomultiplier tube or other photoelectrical transducer is responsive. For example, if the transparency is entirely blue with no green or red component a signal corresponding to maximum "white" is developed in the densitometer section of the channel 7Y and the first balanced cathode follower comprising the triodes 53 and 54 in the channel 7Y will have a zero difference in potential between their cathodes 66 and 67. Following this assumption that the transparency is actually blue, there would be no signal out of the densitometer sections of the channels 7M and 7C because there would be no green light incident on the photomultiplier tube 6G and no red light incident on the photomultiplier tube 6R. Accordingly, the first balanced cathode followers in each of the channels 7M and 7C would be reproducing a maximum "black" signal, that is, the difference in potential between the cathodes 66 and 67 in the channel 7M and the corresponding cathodes in the channel 7C would be maximum. Inasmuch as the reproduction of blue in the final printing process requires magenta and cyan with no yellow the maximum output signal of the first balanced cathode follower in each of the channels 7M and 7C will, as will be seen in due course, result in the light output from the glow tubes 8M and 8C being maximum while the light output from the glow tube 8Y will be minimum or zero. This will expose the printers on the drums 11M and 11C to a maximum extent whereas the exposure of the printer on the drum 11Y will be zero or minimum. Half tone plates made from these printers will accordingly print full magenta and cyan and will not print yellow.

Continuing now with the adjustment of the apparatus it will be seen that the grid 110 of the triode 56 in the second balanced cathode follower is connected through the lead 111 to the cathode 67 of the triode 54 of the preceding balanced cathode follower. Accordingly, the potential of grid 110 is 32 volts. The multiposition switch associated with meter 227 is then set so that its movable contacts 230 and 231 are across the switch contacts 224 and the variable resistance 80 is set so that the meter 227 reads 2 volts. This puts the cathode 69 of the triode section 56 at 34 volts or 2 volts above the potential of grid 110. A similar adjustment of the triode 55 is made by setting the meter switch so that the contacts 230 and 231 are across the fixed contacts 223 and then varying the position of the movable tap on potentiometer 78 in the cathode circuit of the triode 55.

The signal from cathode 66 of triode 53 to the grid 109 of triode 55 passes through a high frequency accentuation circuit which is similar to a peaking circuit. This accents edges and other fine detail in the picture and includes the parallel combination of resistance 104 and capacitance 105 in series with the diode 107 and the resistance 108. The potentiometer 102 in combination with fixed resistance 103 serves as a voltage divider between the cathode 67 and the +60 volt source 32. This provides an adjustable bias for the diode 107 and serves as a variable control for expansion or masking of highlights in the picture being scanned. The first 5 percent of a highlight or maximum "white" signal is required to overcome the bias on the diode and permit it to open or become conductive. Therefore, when the signal is near "white level," for example when a highlight is being scanned, diode 107 is closed or non-conductive and practically all the signal is applied to the grid 109. In this condition capacitance 105 has little effect on highlight detail. This is beneficial in preventing complete elimination of highlight dots normally considered essential in the printing process. As the signal through the resistance 104 and capacitance 105 increases well beyond the "white" level, as when middle tone detail is being scanned, diode 107 becomes conductive and shunts a portion of the signal.

The second balanced cathode follower comprising the triodes 55 and 56 is a low impedance circuit which delivers a signal compensated for "edge" and highlight effects to the following balanced cathode follower comprising the triodes 57 and 58 and also provides a compensated signal to each of the other color channels and to the black channel through the outgoing leads 13CM, 13CY and 15CB$_k$.

The stable voltage on the cathode 69 of the triode 56 serves as a reference voltage in the development of the undercolor removal signal impressed on the grid 116 of the triode 58. In the undercolor-removal circuit the highlight and "edge" compensated signals from the other two color channels are brought in through the leads 13MC and 13YC and are connected to the resistance elements of the potentiometers 123 and 124, respectively, so that the current in the resistance elements and, hence, the voltage drops along them are proportional to the difference in potential of the reference voltage on lead 115 and the compensated signal voltages on leads 13MC and 13YC. Any desired fraction of the voltages across the resistance elements may, therefore, be derived by positioning the movable taps of these two potentiometers.

The fractions of the signal voltages developed in the potentiometers 123 and 124 are weighed against the compensated cyan signal voltage in the resistance elements of the potentiometers 127 and 130, and, again, any desired fraction of the resultant voltage across the resistance element of each potentiometer is selected by adjustment of the movable taps. It is by the adjustment of these four potentiometers that any desired degree of color masking may be effected by the operator of the apparatus.

The voltages at the taps of potentiometers 127 and 130 are applied to the diodes 131 and 132, respectively. These diodes are biased to conducting condition by the +60 volts applied to the resistance 133, typically a high resistance on the order of 2 megohms. Now, if two different voltages are applied to the diodes from the potentiometers 127 and 130 the effect is that the diode having the higher voltage applied to it will cut off or become non-conducting while the diode having the lesser voltage applied to it will remain open. Accordingly, the grid 116 of the triode 58 will always have applied to it the lesser of the two voltages, or of some selected fractions of them, coming in from the other two color channels. This voltage applied to the grid 116 decreases the difference between the two signals on the cathodes 70 and 71 and this is effectively the same as subtracting from the cyan signal, which would appear between the cathodes 70 and 71, in the absence of signals on the aother channels, the smallest signal voltage, or the selected fraction of it, determined by the position of the movable taps on potentiometers. Thus, undercolor removal is the subtraction of a signal from a printing signal where the subtractive signal is obtained from the other two color channels and the signal actually subtracted is the lesser of the two signals or some fraction of it coming from the other color channels.

To facilitate adjustment of this undercolor-removal circuit it is desirable that the potentiometers 123, 124, 127 and 130 be of the linear type. Here it should be noted that if the movable taps of potentiometers 123 and 124 are moved to the top of their resistance elements, no undercolor-removal or masking will be effected. Of course, the same adjustment may be made in all three of the color channels in which case each of the color channels would proceed to print the full signal appearing in that channel.

The signal appearing across the cathodes 70 and 71 provides the only anode plate voltage for the triodes 144 and 145 in the modulator section. Therefore, these two tubes act as a gate, because no signal can be developed in the primary 155 of transformer 156 unless there is a positive potential on the plates 153 and 154 of these tubes. The signal that does appear in the primary 155 is an 8,000 c.p.s. current which is amplitude modulated in accordance with the variations in potential between the cathodes 70 and 71, of the triodes 57 and 58. For example, if the transparency being scanned included a series of alternate black and white stripes the signal passed through the modulator section would be a series of discreet bursts of an amplitude depending on the difference of potential between the cathodes 70 and 71. The modulated A.C. signal is amplified in the push-pull amplifier circuit comprising the triodes 158 and 159 and is then demodulated by the parallel diodes 174 and 175. The demodulated signal is developed across resistances 178 and 188 and the capacitance 189 serves as a carrier filter. Variable bias is developed in the potentiometer 190 and the balanced signal at the movable tap of potentiometer 188 is applied to the control grid 196 of the driver tube 185.

As previously explained the switch 179 permits reversal of the polarity of the demodulated signal applied to the driver tube. With the ganged, movable contacts of the switch in the "up" position across contacts 181 and 182 the signal is applied to produce a positive printer and with the movable contacts in the "down" position across the switch contacts 183 and 184 the signal is applied to produce a negative printer. If a positive printer is to be reproduced the bias voltage developed in potentiometer 190 is increased so that with zero or minimum signal minimum illumination by the glow tube is effected because the tube 185 is drawing current. On the other hand, if a negative printer is to be made the bias voltage is adjusted to provide maximum current when there is no output signal from the demodulator. A negative signal then increases the bias on tube 185 and reduces the current as well as the light output from the glow tube.

The combination of potentiometer 197 and the varistor 199 operates as a linearity control in conjunction with the fixed resistances 195 and 198. Because the varistor is non-linear, its resistance dropping with an increase in applied voltage, the effect is that this circuit compensates for the non-linear characteristics of the driver tube 185 to provide a current through the glow tube that is substantially proportional to the signal across the demodulator load resistance. The values of the resistances 195 and 198 and the varistor 199 are determined by characteristics of the film used for recording. It may be desirable to alter the values of these resistances for different films.

Meter 215 and its associated circuit is used to monitor the glow tube current when the potentiometers 188 and 190 are being adjusted for positive maxima and minima and negative maxima and minima. As an example, if white is being scanned there will be no output signal from the demodulator and minimum glow tube current is required. Hence, with the push-button 212 closed the movable tap of potentiometer 190 should be adjusted so that the bias on the control grid 196 of driver tube 185 results in minimum glow tube current. Similarly, when a "black" signal appears at the output of the demodulator, maximum glow tube current is required. Therefore, with the push-button 212 open potentiometer 188 should be adjusted so that the current in the glow tube is maximum.

The computer section of the black channel shown in FIG. 3 operates in substantially the same way as the third balanced cathode follower of each of the color channels except that the comparator circuit comprising the diodes 254, 255 and 256 select the lesser of the three signals on the incoming leads 15YB$_k$, 15MB$_k$ and 15CB$_k$. Accordingly, the output signal to the modulator section of the black channel will be the difference between the signal selected by the comparator circuit and the reference voltage. This output signal appears between the cathodes 248 and 251 of the triodes 244 and 245 of FIG. 3. As will be apparent from the foregoing description of the operation of the channels, if black is being scanned maximum signals will appear in all of the three color channels. The result will be that the comparator operating in conjunction with the third balanced cathode follower in each of the color channels will result in zero or minimum output signals between the cathodes of the third balanced cathode follower in each color channel so that the glow tubes are not energized. Hence, there will be no exposure of the color printers.

The effect of these maximum signals will be to cause the black channel to print full black since no voltage will be applied to grid 258, all of the three diodes 254, 255 and 256 being cut off. Accordingly, there will be no subtraction in the triode 244 of the black computer section and maximum voltage will exist between the cathodes 248 and 251. The result will be maximum exposure of the black printer.

Having described a particular embodiment of our invention and its operation we wish it to be understood that the invention is not limited to the details of this one embodiment. The invention is defined in the following claims.

We claim:

1. Apparatus for resolution of an original multicolored image into a plurality of corresponding monocolor photographic images, each of said monocolor images being representative of the distribution of one complementary color required to produce in combination with the other monocolor images the multicolors of the original image, which apparatus comprises means for illuminating and optically scanning an original multicolored image element by element and for resolving the light received from the original image into the primary colors of which each element of the original image is composed, photoelectric means for developing a separate signal potential proportional to the intensity of each of the primary colors into which the light from each element of the original image is resolved, which photoelectric means for each color comprises a photoelectron multiplier tube having a light sensitive photo-cathode, a plurality of electron emitting dynodes and an anode, a source of reference potential, means for energizing said photo-cathode at a negative potential with respect to said reference potential, means for energizing said anode at a positive potential with respect to the potential of said photo-cathode, means for energizing said dynodes at progressively greater potentials within the range between the potential of said photo-cathode and the reference potential, said dynodes being arranged such that that dynode at the lowest potential receives electrons emitted by said photo-cathode and emits one or more secondary electrons in response to the received electron and, further, such that a dynode at a higher potential receives electrons emitted by the dynode at the next lower potential and emits at least one secondary electron in response to each received electron, an individual computing channel for the signal potential developed by each of said photoelectric means, each of said channels further comprising means responsive to the signal potential developed by the photoelectric means, which responsive means comprises a vacuum tube having an anode, a grid and a cathode, said cathode being connected to said source of reference potential, said anode being energized at a potential positive with respect to said reference potential, and said grid being connected to one of said dynodes having a potential such that the cathode-grid current of said vacuum tube is logarithmically proportional to the potential of the dynode connected to the grid of the vacuum tube, means for developing a signal potential inversely related to the signal potential proportional to optical density of said original image, an electro-luminescent transducer energized by said signal potential inversely related to optical density, means for directing along a predetermined path the light emanating from the electro-luminescent means of each channel, and means for mounting a photosensitive surface such that there is relative motion, synchronized with said image scanning means, between said surface and the light emanating from said electro-luminescent means, whereby the plate-cathode current in said vacuum tube is logarithmically proportional to said signal potential and is therefore directly proportional to optical density of the primary color of the original image to which the photoelectric means associated with the particular channel is responsive.

2. Apparatus according to claim 1 in which the means for developing the signal potential inversely related to the signal potential proportional to optical density of said original image comprises a balanced cathode follower comprising a pair of vacuum tubes each having an anode, a grid and a cathode, means for energizing the anodes of said tubes at a positive potential with respect to the reference potential, means for energizing the grid of one of said pair of tubes at a substantially constant potential and an impedance connected between the cathode of said one tube and the reference potential such that the cathode of said one tube has a substantially unvarying potential, an impedance connected between the cathode of the other of said pair of tubes and the reference potential, means for impressing on the grid of said other tube the signal potential related to optical density of the original image, and an output circuit connected between the cathodes of said pair of vacuum tubes.

3. Apparatus according to claim 2 in which the output circuit connected between the cathodes of the two vacuum tubes comprises a second balanced cathode follower consisting of a pair of vacuum tubes each having an anode, a grid and a cathode, means for energizing the anodes of said tubes at a positive potential with respect to the predetermined reference potential, means for energizing the grid of one of said tubes at the potential of the cathode of said one tube in the first balanced cathode follower, an impedance connected between the cathode of said one tube in the second balanced cathode follower and the reference potential such that the cathode has a substantially unvarying potential, an impedance connected between the cathode of the other tube of said second balanced cathode follower and the reference potential, means for impressing on the grid of the other of said tubes of said second balanced cathode follower the varying potential of the cathode of the other of said tubes in said first balanced cathode follower, and an output circuit connected between the cathodes of the two vacuum tubes of the second balanced cathode follower.

4. Apparatus according to claim 3 in which the means for impressing on the grid of the other of said tubes of said second balanced cathode follower comprises a parallel resistance-capacitance combination connected between the cathode of the other of said tubes of said first balanced cathode follower and the grid of the other of said tubes of said second balanced cathode follower.

5. Apparatus according to claim 4 which further comprises a diode device connected between the grid of the other of said tubes of said second balanced cathode follower and a source of bias potential.

6. Apparatus according to claim 3 and which further comprises a third balanced cathode follower which consists of a pair of vacuum tubes each having an anode, a grid and a cathode, means for energizing the anodes of said tubes at a positive potential with respect to the reference potential, means for energizing the grid of one of said tubes of said third balanced cathode follower at the potential of the cathode of the other of said tubes of said second balanced cathode follower, an impedance connected between the cathode of said one tube of said third balanced cathode follower and the reference potential, an impedance connected between the cathode of the other of said tubes of said third balanced cathode follower and means for energizing the grid of the other of said tubes of the third balanced cathode follower at a potential which is proportional to the difference between the potentials of said one tube of said second balanced cathode follower and a predetremined fraction of the least of the potentials at the cathodes of the other of the tubes of the second balanced cathode followers of the other two channels, and an output circuit connected between the cathodes of the tubes of the third balanced cathode follower.

7. Apparatus according to claim 6 in which the output circuit of the third balanced cathode follower comprises gated modulating apparatus for modulating an alternating current carrier potential in accordance with the variations in amplitude of the potential between the cathodes of said tubes of said third balanced cathode follower, said gated modulating apparatus comprising two vacuum tubes, each of said tubes having an anode, a grid and a cathode, grid-cathode circuits for said tubes including a source of alternating current carrier potential, a load impedance connected in circuit with the anodes of said tubes, means for energizing said anodes solely by means of the difference in potential between the cathodes of the tubes of said third balanced cathode follower and means coupled to the load impedance of said gated modulating apparatus for amplifying and demodulating the signal developed in said load impedance.

8. Apparatus according to claim 3 and which further comprises a third balanced cathode follower which consists of a pair of vacuum tubes each having an anode, a grid and a cathode, means for energizing the anodes of said tubes at a positive potential with respect to the reference potential, means for energizing the grid of one of said tubes of said third balanced cathode follower at the potential of the cathode of the other of said tubes of said second balanced cathode follower, an impedance connected between the cathode of said one tube of said third balanced cathode follower and the reference potential, an impedance connected between the cathode of the other of said tubes of said third balanced cathode follower and means for energizing the grid of the other of said tubes of the third balanced cathode follower at a potential which is proportional to the difference between the potentials of said one tube of said second balanced cathode follower and a predetermined fraction of the least of the potentials at the cathodes of the other of the tubes of the second balanced cathode followers of the other two channels, and an output circuit connected between the cathodes of the tubes of the third balanced cathode follower and means responsive to the signal in said output circuit of said third balanced cathode follower for energizing said electro-luminescent transducer, said apparatus also having a black channel comprising a pair of vacuum tubes each of which has an anode, a grid and a cathode, means for energizing the anodes of said tubes in said black channel at a potential positive with respect to said reference potential, an impedance connected between the cathode of one of said black channel balanced cathode follower tubes and said reference potential, means for energizing the grid at a substantially unvarying potential, an impedance connected between the cathode of the other of said tubes of said black channel balanced cathode follower and the reference potential, potential comparator means comprising a diode device for each of said color channels, each of said diode devices having impressed thereon the potential of the cathode of the other of said tubes of the second balanced cathode follower in the channel associated with said diode device, the other terminals of said plurality of diode devices being connected to the grid of the other of said tubes of said black channel balanced cathode follower and to a source of bias potential, a black channel electro-luminescent transducer energized by the signal potential between the cathodes of the tubes of said black channel balanced cathode follower, means for said black channel for mounting a photo-sensitive surface for motion in two directions, means synchronized with said scanning means for driving said black channel mounting means such that a predetermined fixed point traverses the photo-sensitive surfaces on said black channel mounting means along a path corresponding to the path followed by said scanning means over the original image and means for directing the light output of said black channel electro-luminescent transducer onto the photo-sensitive surface of the black channel mounting means at the predetermined fixed point.

References Cited in the file of this patent

UNITED STATES PATENTS

| | | |
|---|---|---|
| 2,156,659 | Urtel | May 2, 1939 |
| 2,250,730 | Stewart et al. | July 29, 1941 |
| 2,413,706 | Gunderson | Jan. 7, 1947 |
| 2,417,023 | Sweet | Mar. 4, 1947 |
| 2,434,561 | Hardy et al. | Jan. 13, 1948 |
| 2,569,948 | Polonsky | Oct. 2, 1951 |
| 2,737,547 | Deming | Mar. 6, 1956 |
| 2,757,571 | Loughren | Aug. 7, 1956 |
| 2,841,718 | Hoover | July 1, 1958 |
| 2,841,719 | Radcliffe | July 1, 1958 |
| 2,842,610 | Crosfield et al. | July 8, 1958 |
| 2,852,977 | Hutchins | Sept. 23, 1958 |
| 2,854,635 | Anderson | Sept. 30, 1958 |
| 2,757,571 | Loughren | Aug. 7, 1956 |
| 2,866,103 | Blake et al. | Dec. 23, 1958 |
| 2,900,524 | Le Roy Peterson | Aug. 18, 1959 |